United States Patent
Iio et al.

(10) Patent No.: US 7,563,395 B2
(45) Date of Patent: Jul. 21, 2009

(54) FLAME RETARDANT

(75) Inventors: Motoaki Iio, Susono (JP); Koji Kodama, Susono (JP); Shuichi Kimura, Susono (JP); Kiyoshi Yagi, Susono (JP); Makoto Egashira, Nagasaki (JP)

(73) Assignees: Yazaki Corporation, Tokyo (JP); Nagasaki University, Nagasaki (JP)

( * ) Notice: Subject to any disclaimer, the term of this patent is extended or adjusted under 35 U.S.C. 154(b) by 45 days.

(21) Appl. No.: 11/587,159

(22) PCT Filed: Apr. 20, 2005

(86) PCT No.: PCT/JP2005/007547

§ 371 (c)(1),
(2), (4) Date: Mar. 6, 2007

(87) PCT Pub. No.: WO2005/103203

PCT Pub. Date: Nov. 3, 2005

(65) Prior Publication Data

US 2007/0221891 A1  Sep. 27, 2007

(30) Foreign Application Priority Data

Apr. 20, 2004 (JP) .............................. 2004-124596
Mar. 30, 2005 (JP) .............................. 2005-098924

(51) Int. Cl.
*C09K 21/00* (2006.01)
*C09K 21/02* (2006.01)
*C09K 21/06* (2006.01)
*C08K 3/22* (2006.01)

(52) U.S. Cl. ....................... 252/609; 252/601; 524/101; 524/433

(58) Field of Classification Search .................. 252/609
See application file for complete search history.

(56) References Cited

U.S. PATENT DOCUMENTS

| 4,671,896 A * | 6/1987 | Hasegawa et al. ........... 523/210 |
| 5,118,748 A * | 6/1992 | Fujita et al. .................. 524/436 |
| 5,827,906 A * | 10/1998 | Metzemacher et al. ...... 523/205 |
| 6,043,306 A * | 3/2000 | Imahashi ..................... 524/436 |
| 6,130,282 A * | 10/2000 | Imahashi et al. ............ 524/436 |
| 2003/0059613 A1* | 3/2003 | Tirelli et al. ................. 428/375 |
| 2003/0176552 A1* | 9/2003 | Hase et al. ................... 524/433 |
| 2004/0127630 A1* | 7/2004 | Herbiet ....................... 524/503 |

FOREIGN PATENT DOCUMENTS

| JP | 8-503501 A | 4/1996 |
| JP | 2001-151952 A | 6/2001 |
| JP | 2002-97319 A | 4/2002 |
| JP | 2003-129056 A | 5/2003 |
| JP | 2003-253266 A | 9/2003 |
| WO | 86/04594 A1 | 8/1986 |

OTHER PUBLICATIONS

Supplementary European Search Report dated Apr. 2, 2008.

* cited by examiner

*Primary Examiner*—Joseph D Anthony
(74) *Attorney, Agent, or Firm*—Sughrue Mion, PLLC

(57) ABSTRACT

A flame retardant is provided which has excellent dispersibility in resin ingredients and can give flame-retardant resin moldings excellent in flame retardancy and mechanical properties.

The flame retardant comprises magnesium hydroxide particles, a higher fatty acid, preferably stearic acid, bonded to part of the surface of the magnesium hydroxide particles, and a silicone oil having reactivity bonded to that surface part of the magnesium hydroxide particles which does not have the higher fatty acid bonded thereto.

2 Claims, 5 Drawing Sheets

FLAME RETARDANT

TECHNICAL FIELD

The present invention relates to a flame retardant. More particularly, the invention relates to a flame retardant which comprises magnesium hydroxide and which, when mixed with resin ingredients in producing flame-retardant resin compositions or flame-retardant resin moldings, shows excellent dispersibility in the resin ingredients and can give flame-retardant resin moldings excellent in flame retardancy and mechanical properties.

BACKGROUND ART

Insulating pressure-sensitive adhesive tapes for electrical parts, building materials including wall papers and sheets, and the like are frequently required to have flame retardancy. Such products which have been in general use are ones made of a poly(vinyl chloride) material. However, these products have a problem that they generate chlorine gas, which is corrosive, upon combustion to corrode external appliances. Furthermore, incineration disposal thereof also poses a problem, for example, that they generate chlorine gas and dioxins. Use of those products has hence come to be restricted.

Under these circumstances, the amount of magnesium hydroxide used as a flame retardant excellent in nontoxicity, less-smoking properties, and noncorrosive properties in flame-retardant resin compositions for use as materials for those products is increasing in recent years (see, for example, patent document 1).

However, in order for magnesium hydroxide to exhibit its flame retardancy, it is required to be added in a concentration as high as about 60% by mass based on the resin ingredient. Plastic composites into which magnesium hydroxide has been added in such a high concentration have a problem that they are reduced in mechanical properties and moldability (see, for example, patent document 2). This is attributable to the decrease in relative polymer amount resulting from the addition of such a large amount of magnesium hydroxide and to the hydrophilicity of magnesium hydroxide itself.

For overcoming those problems, it has been attempted to hydrophobized the surface of magnesium hydroxide with a higher fatty acid or to reduce the addition amount of magnesium hydroxide by mixing various auxiliaries (see, for example, patent document 3). However, even with these attempts, it has been impossible to obtain a fully satisfactory flame-retardant resin molding.

Patent Document 1: JP-A-2000-63583 (pages 1-2)
Patent Document 2: JP-A-2001-288313 (page 2)
Patent Document 3: JP-A-2002-128966 (pages 1-2)

DISCLOSURE OF THE INVENTION

Problems That the Invention is to Solve

An object of the invention is to eliminate the problems of related-art techniques described above and to provide a flame retardant which has excellent dispersibility in resin ingredients and can give flame-retardant resin moldings excellent in flame retardancy and mechanical properties.

Means for Solving the Problems

The present inventors made intensive investigations in order to accomplish that object. As a result, they succeeded in devising a surface treatment for the magnesium hydroxide to be used and have there by achieved the invention. The invention has the following constitutions.

(1) A flame retardant which comprises magnesium hydroxide particles, a higher fatty acid bonded to part of the surface of the magnesium hydroxide particles, and a silicone oil having reactivity bonded to that surface part of the magnesium hydroxide particles which does not have the higher fatty acid bonded thereto.

(2) The flame retardant according to the above (1), wherein the higher fatty acid is stearic acid.

(3) The flame retardant according to the above (1) or (2), wherein the silicone oil having reactivity is a methyl hydrogen silicone oil.

The flame retardant of the invention is explained by reference to the diagrammatic view of FIG. 1. The flame retardant 1 of the invention comprises magnesium hydroxide particles 2, a higher fatty acid 3 bonded to part of the surface of the particles 2, and a silicone oil having reactivity (hereinafter referred to as reactive silicone oil) 4 bonded to that surface part of the magnesium hydroxide particles 2 which does not have the higher fatty acid 3 bonded thereto. More particularly, the higher fatty acid 3 present partly is thought to be bonded to the surface of the magnesium hydroxide particles 2 through ester groups, while the reactive silicone oil 4 is thought to be present in a dehydrogenated state so as to spread over the part where the higher fatty acid 3 is absent.

When the flame retardant is mixed with a resin ingredient, both the higher fatty acid 3 and the reactive silicone oil 4 are presumed to contribute to dispersibility in the resin ingredient. In addition, it is presumed that during combustion of the resin ingredient, the reactive silicone oil 4 forms silicon dioxide in an amorphous form to enhance a carbonization effect and thereby contribute to an improvement in the flame-retardant effect of the magnesium hydroxide.

Advantages of the Invention

The flame retardant of the invention comprises magnesium hydroxide particles, a higher fatty acid bonded to part of the surface of the magnesium hydroxide particles, and a reactive silicone oil bonded to that surface part of the magnesium hydroxide particles which does not have the higher fatty acid bonded thereto. Because of this, the flame retardant, when mixed with resin ingredients, shows excellent dispersibility in the resin ingredients and gives flame-retardant resin moldings excellent in flame retardancy and mechanical properties.

Figure 1:
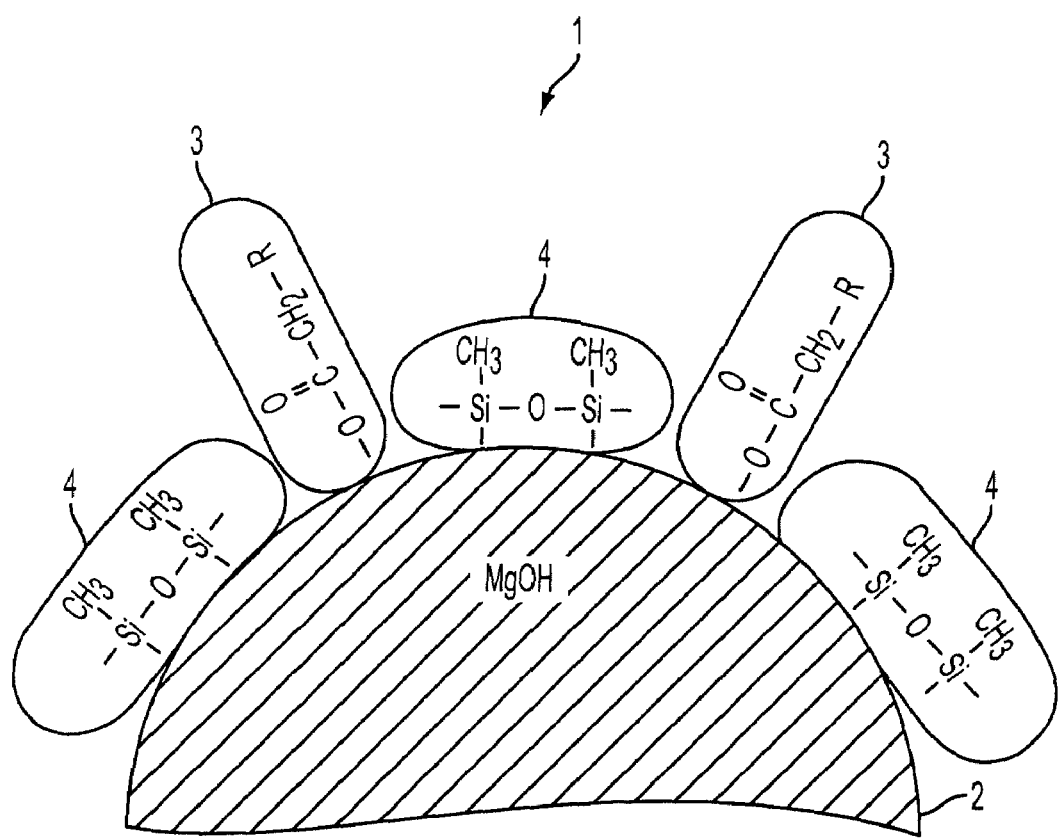
FIG. 1 is a diagrammatic view of a flame retardant of the invention.

DESCRIPTION OF REFERENCE NUMERALS 1 flame retardant
2 magnesium hydroxide particle
3 higher fatty acid
4 reactive silicone oil

BEST MODE FOR CARRYING OUT THE INVENTION

The invention will be explained below in more detail.

The flame retardant of the invention comprises magnesium hydroxide particles, a higher fatty acid bonded to part of the surface of the magnesium hydroxide particles, and a reactive silicone oil bonded to that surface of the particles which does not have the higher fatty acid bonded thereto.

The magnesium hydroxide particles are not particularly limited, and a commercial product thereof may be used as it is. Alternatively, the particles may be produced by synthesis. Although the particle diameter thereof also is not particularly limited, general magnesium hydroxide particles for use as a flame retardant have particle diameters of about several micrometers.

The higher fatty acid is not particularly limited, and examples thereof include stearic acid.

Examples of methods for bonding a higher fatty acid to the surface of magnesium hydroxide particles include a wet method in which the particles are treated with a solution.

The amount of the higher fatty acid to be used for the surface treatment to magnesium hydroxide is not particularly limited. However, as long as the amount thereof is in the range of 0.1-10.0% by mass, preferably 0.1-5.0% by mass, relative to the magnesium hydroxide, moldings obtained from the flame-retardant resin composition have an improved elongation.

Magnesium hydroxide particles thus treated with a higher fatty acid are available also on the market. Examples thereof include Kisuma 5, manufactured by Kyowa Chemical Industry Co., Ltd., Magnifin H5C, manufactured by Albemarle Corp., and Magseeds N4, manufactured by Konoshima Chemical Co., Ltd.

On the other hand, the reactive silicone oil is not particularly limited. Examples thereof include silicon-functional silicone oils such as a methyl hydrogen silicone oil, silanol-containing silicone oil, and alkoxy-containing silicone oil and carbon-functional silicone oils such as an amino-modified silicone oil, carboxylic-acid-modified silicone, carbinol-modified silicone oil, epoxy-modified silicone oil, and mercapto-modified silicone oil.

Such reactive silicone oils improve the dispersibility of magnesium hydroxide particles due to the functional groups possessed by themselves. Furthermore, those reactive silicone oils become a glass ingredient ($SiO_2$) upon combustion and thereby function to improve flame retardancy.

The magnesium hydroxide particles having a higher fatty acid bonded to part of the surface thereof are further subjected to a surface treatment with a reactive silicone oil. Methods for this surface treatment are not particularly limited. The treatment may be conducted by a wet method in which the surface is treated with a solution, a dry method in which an extremely small amount of a solution is used, or another method.

Examples of the method in which the surface is treated with a solution include a method which comprises immersing the magnesium hydroxide particles having a higher fatty acid bonded to part of the surface thereof in a solution containing a reactive silicone oil to wholly cover the particles with the reactive silicone oil, subsequently drying the particles, and then reacting the particles with the oil at a temperature of 100-200° C. for a period of from several minutes to 2 hours.

A general technique as an example of a dry method in which an extremely small amount of a solution is used is the spraying method.

The amount of the reactive silicone oil to be used for the surface treatment to the magnesium hydroxide particles is not particularly limited. However, it is preferred that the amount there of is in the range of 0.1-10.0% by mass, preferably 0.1-5.0% by mass, relative to the magnesium hydroxide particles. This is because as long as the amount of the oil is within that range, the flame-retardant resin moldings have an improved elongation. More preferably, the amount of the oil is in the range of 0.5-3% by mass.

The flame retardant of the invention, when mixed with a resin ingredient, gives a flame-retardant resin composition. Since the flame retardant of the invention shows excellent dispersibility in the resin ingredient in this mixing, flame-retardant resin moldings obtained by molding the flame-retardant resin composition have excellent flame retardancy and are excellent also in mechanical properties including elongation.

The resin ingredient to be used in preparing a flame-retardant resin composition is not particularly limited, and a suitable one can be selected according to the use of the composition and purpose thereof.

The content of the flame retardant in the flame-retardant resin composition can also be suitably selected according to the use of the composition and purpose thereof. However, since the flame retardant of the invention has excellent dispersibility, the amount of the flame retardant to be used tends to be smaller than that of the conventional magnesium hydroxide particles which have undergone no treatment or have been treated with stearic acid only and than that of magnesium hydroxide particles treated with a surface-treating agent other than reactive silicone oils, such as, e.g., a silane coupling agent.

Furthermore, when used in preparing a flame-retardant resin composition, the flame retardant of the invention may be used in combination with one or more other flame retardants according to need.

EXAMPLES

The invention will be explained below in more detail by reference to Examples, but the scope of the invention should not, of course, be limited by these Examples.

[Test 1]

Magnesium hydroxide particles whose surface had been treated with stearic acid (Kisuma 5, manufactured by Kyowa Chemical Industry Co., Ltd.; average particle diameter, 0.6-1 μm) were immersed in a treating liquid containing a methyl hydrogen silicone oil (MHS), dried, and then heated. A surface treatment was thus conducted so as to result in a combined MHS amount of 1% by mass. The magnesium hydroxide particles treated are referred to as flame retardant A.

For the purpose of comparison, the following flame retardants were prepared; flame retardant B, which consisted of the magnesium hydroxide particles (Kisuma 5); flame retardant C, which consisted of the magnesium hydroxide particles (Kisuma 5) and, bonded thereto, 1% by mass dimethyl phenyl silicone (unreactive silicone oil) only; flame retardant D, which consisted of the magnesium hydroxide particles (Kisuma 5) and, bonded thereto, 1% by mass methyl phenyl silicone (unreactive silicone oil) only; flame retardant E, which consisted of the magnesium hydroxide particles (Kisuma 5) and, bonded thereto, 1% by mass vinylsilane coupling agent only; and flame retardant F, which consisted of the magnesium hydroxide particles (Kisuma 5) and, bonded thereto, 1% by mass aminosilane coupling agent only.

Figure 2:
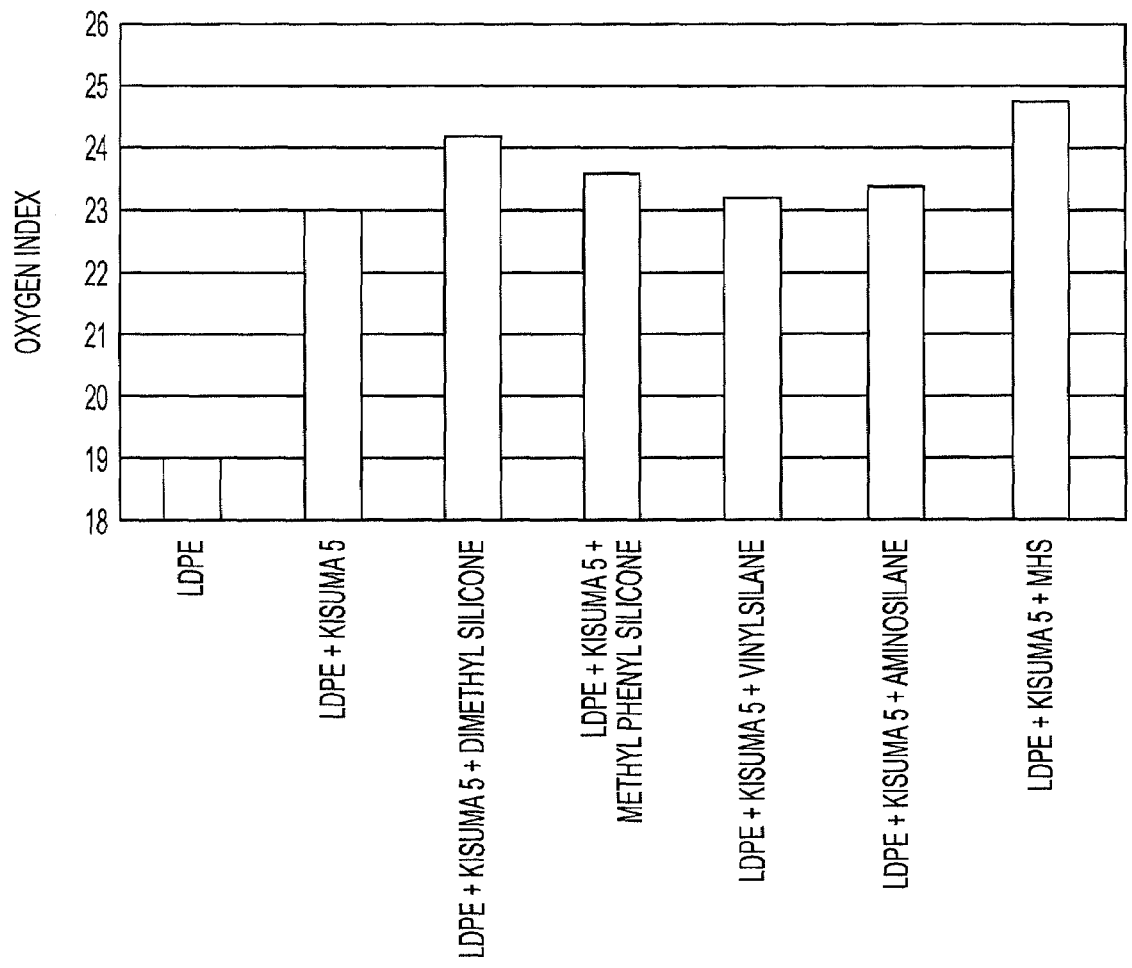
FIG. 2 is a graph showing the results of an oxygen index measurement for each flame retardant in Test 1.

Each of the flame retardants A to F and low-density polyolefin (LDPE) were introduced into a two-roll mill in proportions of 40% by mass and 60% by mass, respectively, based on the whole and the ingredients were kneaded to produce a compound. Subsequently, this compound was extruded into a sheet, and this sheet was placed in a mold having dimensions of 150 mm×150 mm and a thickness of 3 mm and compression-molded to produce a sample sheet. The molding was conducted under the conditions of 150 kg and 2 minutes after 5-minute prepressing at 170° C. and 30 kg. Thereafter, the sheet was cooled to room temperature over 5 minutes. Subsequently, in order to evaluate flame retardancy, test pieces (80×50 mm strips) were punched out of the sample sheet and examined for oxygen index with a D-type candle flammability tester (manufactured by Toyo Seiki Seisaku-Sho, Ltd.) in accordance with JIS K 7201-2. For the purpose of comparison, the LDPE alone containing no flame retardant was also examined for oxygen index. The results obtained are shown in FIG. 2.

[Test 2]

Magnesium hydroxide particles whose surface had been treated with stearic acid (Kisuma 5, manufactured by Kyowa Chemical Industry Co., Ltd.; average particle diameter, 0.6-1 μm) were immersed in treating liquids differing in MHS concentration, dried, and then heated to there by produce various flame retardants differing in combined MHS amount.

Figure 3:
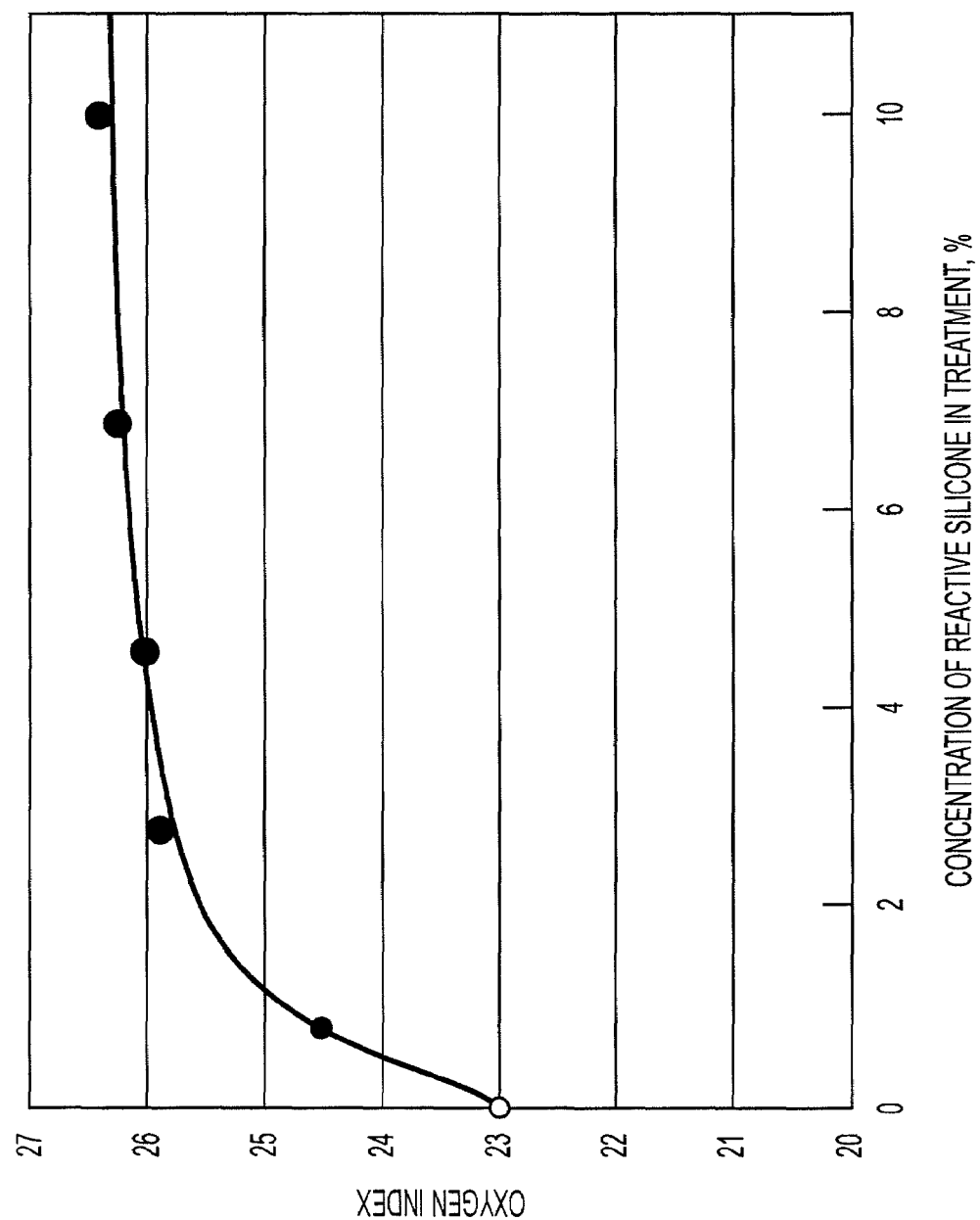
FIG. 3 is a graph showing the relationship between the concentration of a reactive silicone oil in treatment and oxygen index in Test 2.

In the same manner as in Test 1, each of those flame retardants and low-density polyolefin (LDPE) were kneaded together in proportions of 40% by mass and 60% by mass, respectively, based on the whole to prepare a compound. Test pieces were produced from each compound and examined for oxygen index in the same manner as in Test 1. The results obtained are shown in FIG. 3.

Figure 4:
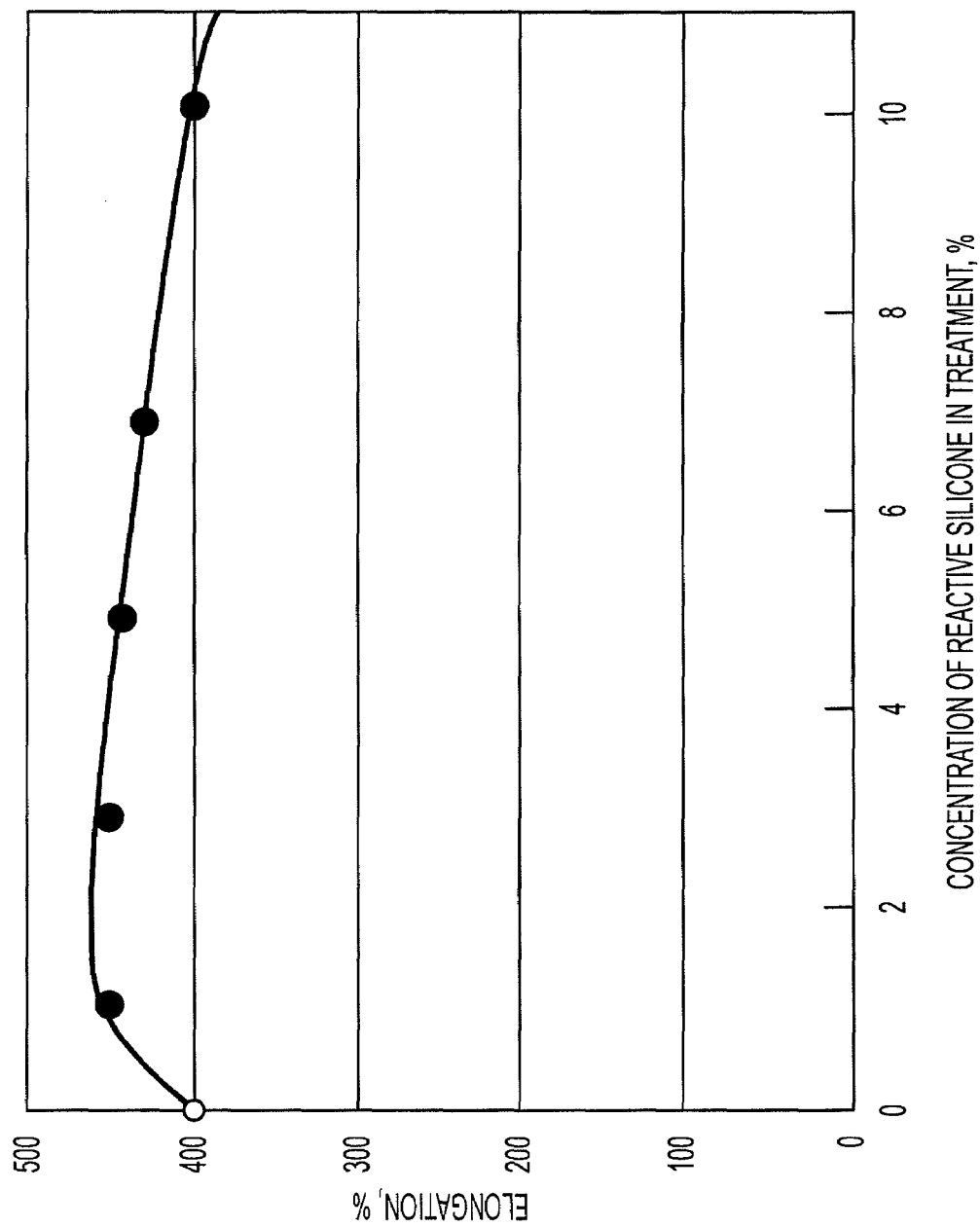
FIG. 4 is a graph showing the relationship between the concentration of a reactive silicone oil in treatment and elongation in Test 2.

Furthermore, each of the same compounds was placed in a mold having a thickness of 1 mm and compression-molded to obtain a sample sheet. Dumbbell No. 3 test pieces as provided for in JIS K 7113 were punched out of the sample sheet and subjected to a tensile test with Strograph Type R (manufactured by Toyo Seiki Seisaku-Sho, Ltd.). The pulling rate was 50 mm/min. Reference lines were drawn in a central part of each test piece at an interval of 20 mm and the elongation at break was measured. The results obtained are shown in FIG. 4.

For the purpose of comparison, the magnesium hydroxide whose surface had been treated with stearic acid (Kisuma 5, manufactured by Kyowa Chemical Industry Co., Ltd.) was used to produce test pieces of the same kinds, which were examined for oxygen index and elongation. The measured values of the respective properties are shown in FIGS. 3 and 4 as open circles, which indicate a reactive-silicone concentration in treatment of 0%.

[Test 3]

Magnesium hydroxide particles (flame retardant G) (Magnifin H7, manufactured by Mlbemarle Corp.; average particle diameter, 0.8-1.1 μm) and flame retardant H which was the magnesium hydroxide particles treated with stearic acid (Magnifin H7C, manufactured by Albemarle Corp.) were prepared. Furthermore, the magnesium hydroxide particles were immersed in an MHS-3% treating liquid, dried, and then heated to bond the reactive silicone oil and thereby prepare flame retardant I. Moreover, the magnesium hydroxide particles whose surface had been treated with stearic acid were immersed in an MHS-3% treating liquid, dried, and then heated to bond the reactive silicone oil and thereby prepare flame retardant J.

Figure 5:
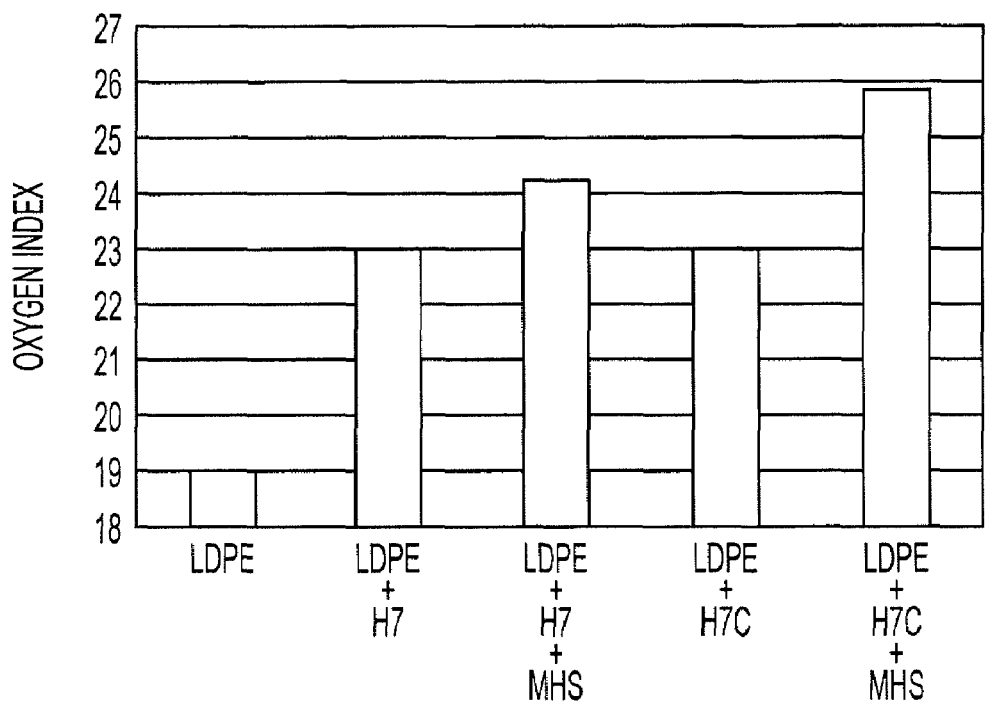
FIG. 5 is a graph showing the results of an oxygen index measurement for each flame retardant in Test 3.

In the same manner as in Test 1, each of those flame retardants and low-density polyolefin (LDPE) were kneaded together in proportions of 40% by mass and 60% by mass, respectively, based on the whole to prepare a compound. Test pieces were produced from each compound and examined for oxygen index in the same manner as in Test 1. For the purpose of comparison, the LDPE alone containing no flame retardant was also examined for oxygen index. The results obtained are shown in FIG. 5.

[Test 4]

Magnesium hydroxide particles (MagnifinH7, manufactured by Albemarle Corp.; average particle diameter, 0.8-1.1 μm) were immersed in an MHS-1% treating liquid, dried, and then heated to bond the reactive silicone oil and thereby prepare flame retardant K. Furthermore, the magnesium hydroxide particles whose surface had been treated with stearic acid (Magnifin H7C, manufactured by Albemarle Corp.) were immersed in an MHS-1% treating liquid, dried, and then heated to bond the reactive silicone oil and thereby prepare flame retardant L. Moreover, the flame retardant G and flame retardant H used in Test 3 were prepared.

Figure 6:
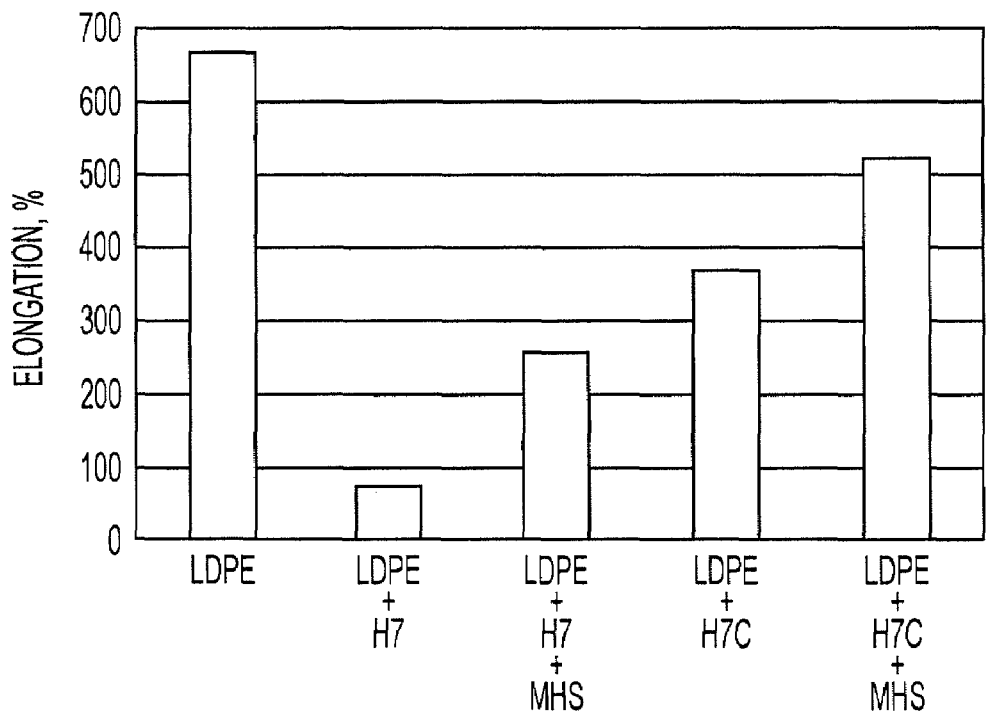
FIG. 6 is a graph showing the results of an elongation measurement for each flame retardant in Test 4.

In the same manner as in Test 2, each of those flame retardants and low density polyolefin (LPDE) were kneaded together in proportions of 40% by mass and 60% by mass, respectively, based on the whole to prepare a compound. Test pieces were produced from each compound and examined for elongation in the same manner as in Test 1. For the purpose of comparison, the LPDE alone containing no flame retardant was also examined for elongation. The results obtained are shown in FIG. 6.

The following can be seen from the results of the Tests. When the flame retardants according to the invention which comprise magnesium hydroxide particles, stearic acid bonded to the surface of the particles, and MHS bonded to the surface part having no stearic acid bonded thereto are used, flame retardancy is enhanced and mechanical properties such as elongation are also enhanced, as compared with the case of using the magnesium hydroxide particles to which stearic acid only has been bonded, the magnesium hydroxide particles to which MHS only has been bonded, or the magnesium hydroxide particles to which a silane coupling agent which is not a reactive silicone oil has been bonded.

While the invention has been described in detail and with reference to specific embodiments thereof, it will be apparent to one skilled in the art that various changes and modifications can be made therein without departing from the spirit and scope thereof.

The invention claimed is:

1. A flame retardant which comprises magnesium hydroxide particles, a higher fatty acid bonded to part of the surface of the magnesium hydroxide particles, and a methyl hydrogen silicone oil having reactivity bonded to that surface part of the magnesium hydroxide particles which does not have the higher fatty acid bonded thereto.

2. The flame retardant according to claim 1, wherein the higher fatty acid is stearic acid.

* * * * *